United States Patent [19]
Nguyen

[11] Patent Number: 5,444,823
[45] Date of Patent: Aug. 22, 1995

[54] INTELLIGENT SEARCH ENGINE FOR ASSOCIATED ON-LINE DOCUMENTATION HAVING QUESTIONLESS CASE-BASED KNOWLEDGE BASE

[75] Inventor: Trung D. Nguyen, Tomball, Tex.

[73] Assignee: Compaq Computer Corporation, Houston, Tex.

[21] Appl. No.: 325,541

[22] Filed: Oct. 18, 1994

Related U.S. Application Data

[63] Continuation of Ser. No. 48,879, Apr. 16, 1993, abandoned.

[51] Int. Cl.⁶ .............................................. G06F 15/18
[52] U.S. Cl. ......................................... 395/51; 395/10
[58] Field of Search ............................. 395/10, 51, 77

[56] References Cited

U.S. PATENT DOCUMENTS

| | | | |
|---|---|---|---|
| 5,138,669 | 8/1992 | Shiumura et al. | 382/37 |
| 5,224,206 | 6/1993 | Simoudis | 395/77 |
| 5,243,689 | 9/1993 | Yoshiura et al. | 395/51 |
| 5,267,156 | 11/1993 | Nomiyama | 364/419.02 |
| 5,317,677 | 5/1994 | Dolan et al. | 395/10 |
| 5,319,739 | 6/1994 | Yoshiura | 395/77 |
| 5,333,237 | 7/1994 | Stefanopoulos et al. | 395/12 |

OTHER PUBLICATIONS

Koton, "Using Experience in Learning and Problem Solving", Oct. 1988 pp. 1–97.
Dearden, "Interacting with a Case Memory", IEE Colloquium on Case Based Reasoning, Feb. 12 1993, pp. 3/1–3/4.
Simoudis, "Using Case Based Retrieval for Customer Technical Support", IEEE Expert vol. 7 ISS 5 pp. 7–12 Oct. 1992.
Ashley et al, "A Case-Based Approach to Modeling Legal Expertise", IEEE Expert vol. 3 ISS 3 pp. 70–77 Fall 1988.
Shafer, "CBR Express: Getting Down to Cases", PCAI Jul./Aug. 1991, pp. 42–45.
Keen, "Case Bases for Help Desks", IEE Colloquium on Case-Based Reasoning, Feb. 12, 1993, pp. 8/1–8/25.
Bronerman et al, "Case-Based Hypermedia Access of Lessons Learned to Accomplish Technology Transfer", IEEE/Semi Advanced Semi-Conductor Mfg Conf+Workshop, Sep. 30–Oct. 1992, pp. 194–198.
MicroSoft Mail 1984–1992 pp. 1–2.
Simpson, "Mastering Wordperfect 5.1+5.2 for Windows", pp. 1083–1084 1993, Earlier Version 1992.

*Primary Examiner*—Robert W. Downs
*Attorney, Agent, or Firm*—Konneker & Bush

[57] ABSTRACT

A system and an associated method for determining a solution to a problem using on-line documentation. The system includes a processor-based intelligent search engine and an associated questionless case-based knowledge base which contains a series of questionless case structures, each comprised of a title, a description of a particular problem and a solution to the particular problem, stored in memory. Using a natural language description of the problem which is capable of representation by one or more strings of alpha-numeric characters, the search engine selects the questionless case structures which contains the solution to the problem by searching, each time one of the alpha-numeric characters is input, the knowledge base to identify those case structures which contain at least one word, or a portion thereof, which either matches the series of alpha-numeric characters, three consecutive alpha-numeric characters of the series of characters, or a numeric representation which falls within a predetermined value of a numeric representation input thereto. The case structures are ranked according to the type and number of matches and the case structure having the most matches is selected as containing the most probable solution to the problem.

8 Claims, 2 Drawing Sheets

```
                                    42
┌─────────────────────────────────────────────────────────────┐
│ TITLE-Print Quality-Blurs/Smears                            │
│ DESCRIPTION                                                 │
│      SYMPTOMS-Print quality has blurs/smears problem on the printed page. │
│ ACTIONS                                                     │
│      Procedure to resolve "Blurs/Smears" in print quality   │
└─────────────────────────────────────────────────────────────┘
```

*FIG. 4A*

```
                                    44
┌─────────────────────────────────────────────────────────────┐
│ TITLE: Win, MS Word-Fonts are not updated correctly         │
│ DESCRIPTION:                                                │
│      H/W-N/A                                                │
│      HOST-PC                                                │
│      OPERATING ENVIRONMENT-Windows 3.x                      │
│      APPLICATION S/W-MS Word for Windows 1.1a               │
│      SYMPTOMS-The fonts just added in ATM are not available in │
│      the Microsoft Word Font menu.                          │
│ ACTIONS                                                     │
│      Click on Word for Windows Printer Setup to update the Font selection │
└─────────────────────────────────────────────────────────────┘
```

*FIG. 4B*

INTELLIGENT SEARCH ENGINE FOR ASSOCIATED ON-LINE DOCUMENTATION HAVING QUESTIONLESS CASE-BASED KNOWLEDGE BASE

This is a continuation of application Ser. No. 08/048,879, filed Apr. 16, 1993 now abandoned.

CROSS REFERENCE TO RELATED APPLICATION

This application is related to co-pending U.S. patent application Ser. No. 08/048,880, filed on even date herewith, assigned to the Assignee of the present application, and hereby incorporated by reference as if reproduced in its entirety.

BACKGROUND OF THE INVENTION

1. Field of the Invention

The present invention generally relates to an intelligent search engine for accessing associated on-line documentation and, more particularly, to an intelligent search engine for accessing associated on-line documentation which incorporates a questionless case-based knowledge base therein.

2. Description of Related Art

Expert systems are comprised of two parts, a knowledge base and an engine. Traditionally, the engine has either been a reasoning or inference engine which embodies a problem-solving method or procedure and uses the knowledge in the knowledge base to construct a line of reasoning which leads to a solution for the problem. The most common line of reasoning used by an expert system involves the chaining, either forward, backward or a flexible mix thereof, of IF-THEN rules. However, as knowledge of the domain for a particular problem is almost always incomplete and, has, therefore, a degree of uncertainty in the solution thereof, a rule may have associated therewith, a confidence factor ("CF") or weight. Alternately, using "fuzzy logic", the degree of uncertainty associated with a rule may be represented by a distribution of values. Using the CFs or uncertainty distribution, the inference engine is able to evaluate various lines of reasoning and provide probabilities of correctness for the various lines of reasoning.

Typically, the knowledge base of an expert system is organized in a specific representational form for use by the inference engine. One such system, generally referred to as a rule-based system, arranges knowledge as a series of rules, each consisting of an IF part and a THEN part. The IF part lists a set of conditions in some logical combination. The piece of knowledge represented by the rule is relevant to the line of reasoning being developed if the IF part of the rule is satisfied. Consequently, the THEN part can then be concluded, or its action taken.

A related representational form of a knowledge base which is more suitable for use in complex systems is generally referred to as a "case-based" knowledge base. In this format, knowledge is arranged as a series of discrete record entities commonly known as cases. Generally, a knowledge base would be provided with a case for each problem to be addressed by the associated expert system. Each case is structured to include a title, a description field, a list of questions and answers, and a solution. Various case-based systems which are similar to the system described above and which are presently commercially available include CBR Express and Case- Point, both of which are manufactured by Inference Corporation of El Segundo, Calif.

When executing an operation, for example, determining a solution to a problem, using a case-based reasoning system, the user of the system is required to type in a natural language description of a symptom of the problem. Using the symptom provided by the user, the engine scans all of the questions residing in the knowledge base and returns with a list of questions to be answered by the user. Based upon the answers to the proffered questions, the engine narrows the search to a solution set forth in one of the cases. Expert systems which utilize case-based knowledge bases have several shortcomings, particularly with respect to the question/answer list. In order to function properly, the question/answer list must be carefully crafted such that, based upon the answers to the questions, the engine is led to the correct solution. As a result, formation of the question/answer portion of a case-based knowledge base is a critical element of the case building process which is very manpower intensive and often requires on the order of 70-80% of the total time required to build the knowledge base for an expert system. Due to the demands required to build such a knowledge base, there is often insufficient manpower to fully test and fine-turn the expert system.

Another problem with expert systems which incorporate a case-based knowledge base is that such systems have been traditionally used in the so-called "helpdesk" environment where the actual user of the device would verbally describe the symptoms over the phone to a trained technician at a remote location. The technician would then relay the questions generated by the expert system to the user. As the technician was much more familiar with both the expert system and the knowledge base, unclear or difficult questions could be explained to users with relatively little experience with the expert system. If, however, the expert system were installed in the user's computer system, it is entirely possible that the user would be unable to fully understand the questions. Such questions, if improperly answered, could potentially impede the expert system from being able to properly diagnose a problem.

While it would be desirable to make such automated expert systems broadly available, the "ease of use" problem presented by the expert system's use of the question/answer list remains a serious impediment to acceptance of such systems by the general public. Thus, it can be readily seen from the foregoing that it would be desirable to provide a system having a questionless case-based knowledge base which will provide the user with a solution to a problem without requiring the user to correctly answer a series of questions generated by the system. Accordingly, it is an object of this invention to provide such a system.

SUMMARY OF THE INVENTION

In one embodiment, the present invention is of a system for accessing a topic stored as part of an on-line body of documentation. The system includes a processor-based intelligent search engine for accessing associated on-line documentation which includes a questionless case-based knowledge base. The knowledge base contains a series of questionless case structures, each comprised of first, second and third fields. The first field contains a topic name, the second field, a description of the topic named in the first field and the third field, a pointer which provides a path to the second field. To access the topic, the search engine selects the questionless case structure which contains the topic.

In one aspect, the system also includes a user interface through which a natural language description of the topic may be input as a series of alpha-numeric characters, means for performing a search of the knowledge base each time one of the series of alpha-numeric characters is input and means for identifying the questionless case structures which potentially contain the topic. In various further aspects thereof, the means for identifying the questionless case structures which potentially contain the topic may include means for identifying questionless case structures having at least one word, or a portion thereof, in the first or second fields, which matches the series of alpha-numeric characters, three consecutive alpha-numeric characters of the series of characters, or a numeric representation which falls within a pre-determined value of a numeric representation input by the user as part of the series of characters.

In another embodiment, the present invention is of a system for determining a solution to a problem. The system includes a processor-based intelligent search engine for accessing associated on-line documentation which includes a questionless case-based knowledge base. The knowledge base contains a series of questionless case structures, each comprised of a title, a description of a particular problem and a solution to the particular problem. To solve the problem, the search engine selects the questionless case structure which contains the solution thereto.

In one aspect, the system also includes a user interface, through which a natural language description of the problem may be input the system as a series of alpha-numeric characters. The intelligent search engine may also include means for performing a search of the knowledge base each time one of the series of alpha-numeric characters is input and means for identifying the questionless case structures which contain potential solutions to the problem. In various further aspects thereof, the means for identifying the questionless case structures which contain potential solutions to the problem may include means for identifying questionless case structures having at least one word, or a portion thereof, which matches the series of alpha-numeric characters, three consecutive alpha-numeric characters of the series of characters, or a numeric representation which falls within a pre-determined value of a numeric representation input by the user as part of the series of characters.

In yet another embodiment, the present invention is of a system for using on-line documentation to diagnose a problem. The system is comprised of a questionless case-based knowledge base, a user interface through which a description of the problem may be input the system as a series of alpha-numeric characters and an intelligent search engine which includes means for performing a search of the knowledge base each time an alpha-numeric character is input thereto, means for identifying the questionless case structures which contain at least one word, or a portion thereof, which matches the characters input the search engine and means for ordering the identified questionless case structures based upon the type and number of matches detected during the search.

In one aspect thereof, the search engine further includes means for separating the series of characters into one or more character strings and for performing first, second and third searches of the knowledge base each time an alpha-numeric character is input the search engine. The first search identifies the questionless case structures containing a word, or a portion thereof, which matches one of the character strings input the search engine. The second search identifies the questionless case structures having at least one word, or a portion thereof, which matches three consecutive alpha-numeric characters of one of the character strings input the search engine. Finally, the third search identifies the questionless case structures having a numeric representation which fall within a pre-determined value of a numeric representation input by the user as one of the character strings.

In still yet another embodiment, the present invention is of a method for determining a solution to a problem using on-line documentation. First, a questionless case-based knowledge base comprised of a series of questionless case structures, each of which is comprised of a title, a description and a solution, is provided. A natural language description of a problem which is capable of representation by one or more strings of alpha-numeric characters is then determined. The questionless case-based knowledge base is then searched for case structures which contain a match with one of the strings of alpha-numeric characters. One of the matching case structures is then selected as containing the most probable solution to the problem.

In one aspect thereof, the strings of alpha-numeric characters which describe the natural language description of the problem are provided one at a time and the questionless case-based knowledge base searched each time a character is provided. Preferably, the questionless case-based knowledge base is searched three times each time a character is provided, once to find case structures which contain exact matches to the character strings, a second time to find case structures which contain exact matches of three consecutive characters of the character strings, and a third time to find case structures which contain a numeric representation which differs from a numeric representation provided as one of the character strings by less than a pre-determined value. In another aspect, the case structure containing the most probable solution to the problem is selected by ranking matching case structures in order of type and number of matches and selecting the case structure having the highest ranking for review.

BRIEF DESCRIPTION OF THE DRAWING

The present invention may be better understood, and its numerous objects, features and advantages will become apparent to those skilled in the art by reference to the accompanying drawing, in which:

FIGS 4A–B illustrate first and second examples of typical questionless case structures used to determine solutions to problems detected by a user.

DETAILED DESCRIPTION

Figure 1:
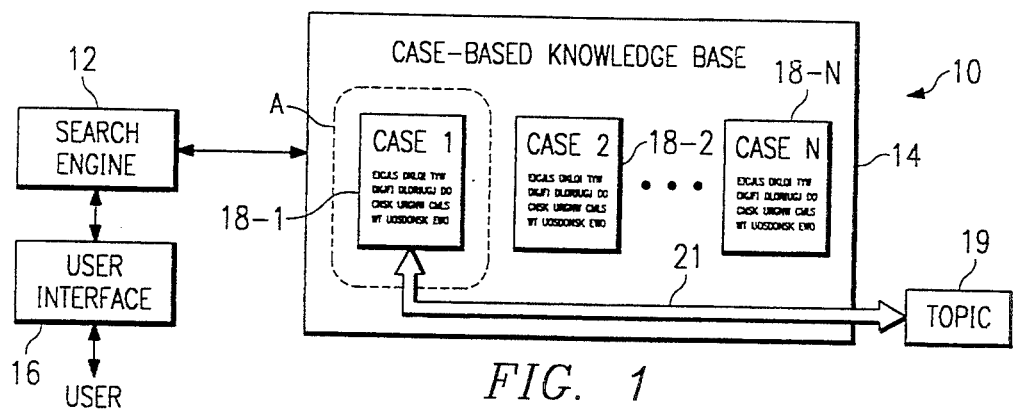
FIG. 1 is a block diagram of an system for accessing on-line documentation constructed in accordance with the teachings of the present invention and incorporating therein an intelligent search engine and an associated questionless case-based knowledge base.

Referring first to FIG. 1, a system 10 suitable for accessing on-line documentation in accordance with the teachings of the present invention will now be described in detail. As disclosed herein, the system 10 is suitable for various purposes which include the diagnosis of devices and/or systems, for example, a network printer, to provide a solution to an operating problem detected by a user of the network printer or other device or system. It is further contemplated that the system 10 is equally suitable for use as a tool for accessing a specific topic or topics within a database or other on-line documentation.

The system 10 includes a processor-based intelligent search engine 12, which, for example, may be designed as an application suitable for use with the Microsoft Windows graphical user interface manufactured by Microsoft Corporation of Redmond, Washington, and an associated knowledge base 14 stored in memory. In response to the input, by the user of the device or system, of a natural language description of a problem to be solved or a topic to be located, via user interface 16, for example, a computer keyboard or other conventional user interface, the search engine 12 performs a search of the knowledge base 14 and identifies an "action" or "solution" in response thereto. For example, if the system 10 is used to diagnose an operating problem observed by the user, the search engine 12 will search the knowledge base 14 to locate either a procedure to solve the operating problem or a location within the knowledge base 14 where additional information on the operating problem is located. Alternately, if the system 10 is used to locate a topic within the knowledge base 14, the search engine 12 will search the knowledge base 14 and provide a location within the knowledge base 14 where the topic is located.

The knowledge base 14 is configured as a case-based knowledge base. By "case-based", it is intended to refer to a knowledge base 14 comprised of a series of discrete cases 18-1, 18-2, 18-N, each relating to a separate topic within the field to which the knowledge base 14 is directed, stored in memory. For example, if the knowledge base 14 is configured to diagnose problems within a network printer, cases 18-1 through 18-N would each contain a description of and a solution to a problem commonly occurring in network printers. Alternately, if the knowledge base 14 is directed to providing access to on-line documentation regarding a field of knowledge, cases 18-1 through 18-N would each contain a description of a topic commonly associated with that field of knowledge.

It is contemplated that, in one aspect of the invention, the intelligent search engine 12 and associated questionless case-based knowledge base 14 may be manufactured from the processor based inference engine and associated knowledge base of an existing expert system, for example, CBR Express. To do so, the provided knowledge base should first be reconfigured such that all question/answer lists are removed from the pre-existing case structures, thereby converting the knowledge base into a questionless case-based knowledge base. As the question/answer list provides the inference engine with a series of rules with which the inference engine arrives at a solution based upon the answers to a series of questions, absent the question/answer list, strictly speaking, the expert system may no longer be viewed as such. The utility program which permitted the processor to arrive at a solution based upon the answers to a series of questions may then be disabled, thereby leaving the processor's searching capabilities as the primary function of the utility program. In this manner, the inference engine is effectively converted into a search engine. Furthermore, when operated in accordance with the procedure to be more fully set forth below, the search engine will be able to determine a solution to a problem based upon the results of a series of searches, thereby producing a search engine which may be considered an "intelligent" search engine.

Figure 2:
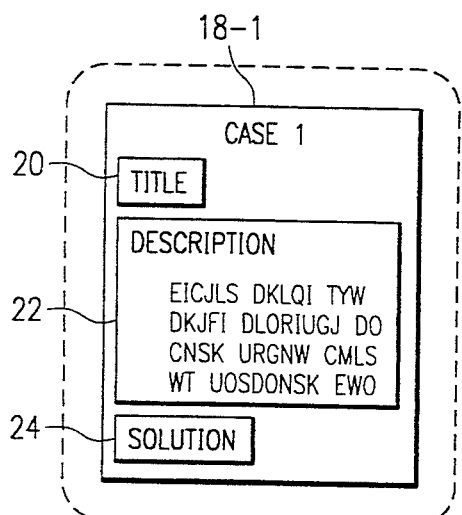
FIG. 2 is an expanded block diagram of Detail A of FIG. 1 and illustrating the structure of a questionless case structure of the questionless case-based knowledge base of FIG. 1.

Referring next to FIG. 2, the structure of a case 18 will now be described in greater detail. Specifically, each case 18 is comprised of three parts: a first (or "title") field 20 used to identify the topic to which the case 18 is directed, a second (or "description") field 22 which contains the information which describes the topic to which the case 18 is directed and a third (or "solution") field 24, also referred to as the action field). Under certain circumstances, most often when the system 10 is used to provide a solution to a problem, the solution field 24 may be an explicit instruction which, if followed, will correct the problem of concern. In most circumstances, however, the solution field 24 will identify where the information contained in the case is located and provide a path to that information for the user. For example, by clicking on the solution field 24, the user is transferred to the description field 22. This type of solution will be appropriate where the solution to the problem requires a detailed explanation or where the system is being used to locate a topic within on-line documentation.

Returning momentarily to FIG. 1, it should be noted that it is further contemplated that the cases 18 within the knowledge base 14 may either be of the exclusive or non-exclusive type. For an exclusive type case, for example, case 18-2, the entire topic is located within the case itself. For a non-exclusive case, for example case 18-1, a portion 19 of the topic is contained at a separate location within the knowledge base 14 accessible from the case 18-1 via path 21. Whether the cases 18 are arranged as exclusive or non-exclusive will depend on the purposes for which the system 10 is to be used, the amount of information to be incorporated within the knowledge base 14 and the technique by which the cases 18 are constructed. For example, if the system 10 is to be used to provide solutions to problems, exclusive cases would be used where the desired solution is to provide a instruction of minimal length to the user or to provide a path to a description located within the case itself. Non-exclusive cases, on the other hand, would be used where the desired solution is to provide a path to a description located outside of the case.

When the system 10 is used to access a topic within a database, the use of exclusive or non-exclusive cases would depend on whether the size of the various topics are such that the system designer would desire to limit the description field within the case structure. For either proposed use of the system 10, non-exclusive cases would be particularly useful if it is necessary to limit the size of the description. For example, if the total amount of information relating to the problems/solutions or topics is so large that, if all of the available information were incorporated into the cases, the time required for the search engine 12 to search the knowledge base 14 would be lengthened to an extent such that the performance of the system 10 would be significantly affected.

The use of exclusive or non-exclusive cases may also vary depending on the manner in which the case structures are constructed. If the case structures are constructed by separating existing on-line documentation for an existing topic into the various fields which comprises the case structure, it would be more efficient to construct exclusive cases. If, however, the case structures are built to provide paths for accessing specific topics within a much larger database, non-exclusive case structures would be preferred. Further information regarding a method for constructing a questionless case-based knowledge base may be seen by reference to co-pending U.S. patent application Ser. No. 08/048,880.

Figure 3:
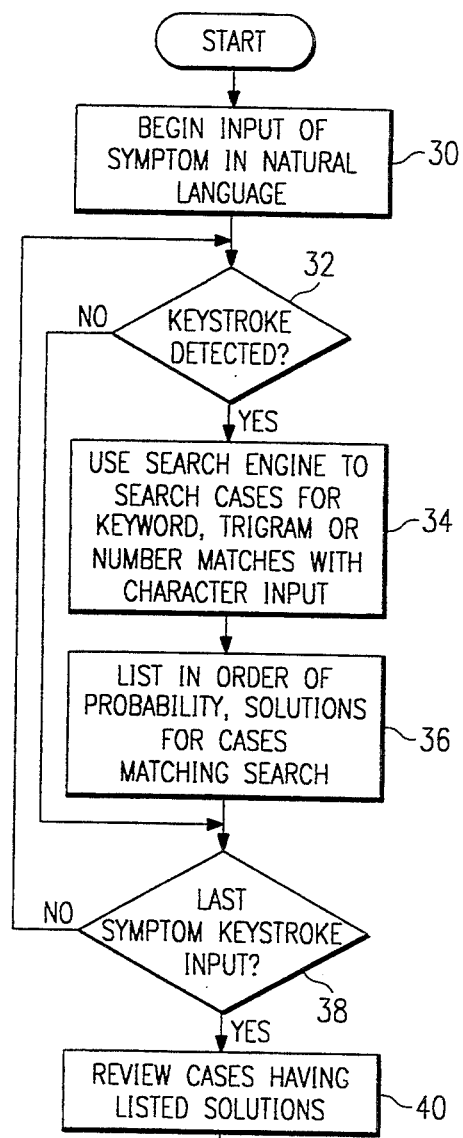
FIG. 3 is a flow chart illustrating a method of accessing on-line documentation to diagnose a device using the intelligent search engine and questionless case-based knowledge base of FIGS. 1–2.

Referring next to FIG. 3, a method of solving a problem using the system 10 comprised of a intelligent search engine 12 and an associated questionless case-based knowledge base 14 will now be described in greater detail. The method of the present invention commences at step 30 when the user begins the input, in natural language, of a description of an operating problem to which a solution is desired. Typically, the description identifies one or more symptoms caused by the operating problem which is noticed by the user. For example, if the user of a network printer noticed that the ink was smeared on the printed sheets output by the printer, the user would load the system 10 into a computer system, advance to the data entry screen, position the cursor to point to the symptoms entry field and type a description of the symptoms into the entry field. For the example described herein, possible descriptions of the problem could include "ink smeared on paper", "printed characters are blurry", or "print blurry".

Proceeding to step 32, if a keystroke entering a character comprising part of the symptom is detected by the search engine 12, the method proceeds to step 34 where the search engine 12 initiates a search of the questionless case-based knowledge base 14. Specifically, the search engine 12 will conduct three searches of all of the cases 18 stored in the questionless case-based knowledge base 14. The first search conducted by the search engine 12 is a "keyword" search during which all of the cases 18 are searched for matches with a string of characters created by a series of keystrokes and separated from adjoining character strings by a space. The second search is a "trigram" search during which all of the cases 18 are searched for matches with a trigram created by the immediately prior three keystrokes. A trigram search is particularly useful to detect matches between a natural language description of a problem and a nearly matching description located in the cases 18, for example, "blur" with "blurred" or "blurry". Trigram searches are also useful to detect matches between the input description and the cases 18 where the input description is misspelled. For example, a trigram search would detect a match between "smeer"and "smear". The third search is a "number" search where matches, within a pre-determined threshold value, between numeric characters input the data entry field and the case structures are sought. For example, if the threshold value were set at 10, the search engine 12 would detect a match between any input value between 90 and 110 and a value of 100, if contained in one of the cases 18.

Returning momentarily to the example of a network printer producing blurry characters and where the user inputs the description "print blurry", the first, second and third searches described above would be conducted for each keystroke. The first search would be performed on the keystroke "p" and would produce a voluminous number of matches. These would include all cases 18 which describe topics generally related to the "printer" or "processor", as well as other, more specific, cases, for example, the case which describes the POST ("power-on self test") procedure.

Proceeding to step 36, the search engine 12 lists, in order of likelihood, the possible solutions to the input problem. More specifically, the search engine 12 reviews the matches between the description of the problem input the search engine 12 and the matches detected between the input description and each case 18. The matching cases are then arranged in order of likelihood that the matched structure contains the correct solution to the problem. It is contemplated that various ranking procedures are suitable for use herein. Suitable procedures may include quite straightforward ranking procedures such as those where the cases are ranked based upon the total number of matches detected for each case or more complicated ranking procedures such as those where a different weight is assigned to each type of match and a composite score is calculated for each case based upon both the number and type of matches detected by the search engine 12.

Proceeding to step 38, if it is determined that there are additional keystrokes to be input the symptom field, the method returns to step 32 to await the detection of additional keystrokes. Most commonly, the user will continue to input keystrokes if additional keystrokes are necessary to complete a character string or if the ranking of possible solutions produced by the prior keystroke has not yet produced a conclusive solution, i.e. a single solution that is ranked significantly higher than all other possible solutions listed. If additional keystrokes are detected, the method again conducts first, second and third searches of all of the cases 18 contained in the knowledge base 14, now using the description as modified by the additional keystroke, followed by a new ranking of the possible solutions to the problem.

For example, in the present example, the next keystroke would modify the search field to "pr", a modification of the search field which would significantly lower the ranking of the POST procedure topic. The third keystroke would modify the search field to "pri", thereby lowering the ranking of the various "processor" topics. The various printer topics would remain approximately equally ranked until the search field is modified to "print b" or "print bl". At this time, the case containing the correct solution will most likely be ranked higher than other printer related topics. In this manner, by continuing to input additional keystrokes related to a natural language description of a problem, the results of each search would be narrowed for each keystroke as an increasing number of matches between the search field and the case structure containing the correct solution are detected. Finally, at the completion of the search, the case structure containing the correct solution is ranked significantly higher than the others.

Returning to step 38, if there are no more keystrokes to be entered into the search field, the user exits the search engine 12 and, proceeding to step 40, enters the questionless case-based knowledge base 14 where the cases 18 having solutions previously ranked at step 36 may be reviewed by the user, for example, by clicking on the listed solution.

Referring next to FIGS. 4A-B, case structure 42, which is directed to the topic of "blurs and smears" and which contains the solution to the problem, and case structure 44, which is directed to the topic of "updating fonts" and which does not contain the solution to the problem may now be seen. As may be seen here, both case structures would produce numerous matches with the first character string "print" but only the case structure 42 would produce matches with the second character string "blurred". While first and second case structures are illustrated in FIGS. 4A and 4B, respectively, it should be clearly noted that a knowledge base would typically include on the order of about 500 cases. These would include the following:

Power On Self Test
PDT Diagnostic
Print Quality
Paper Transportation
Printer Operation
Network Installation
Network Configuration
Network Performance
Network Communications
Application Software
Printer Utility
Print Enhancement Utility
Operating Environment
Printer Care and Maintenance
Printer Configuration
Printer Consumables
Printer Customer Support
Printer Glossary as well as others.

Thus, there has been described and illustrated herein, a system which, by relying on a search engine to search an associated questionless case-based knowledge base, may be used to determine the solution to a problem or a location of a topic within a body of on-line documentation, dramatically reduces the manpower required to construct such a system while simultaneously providing a system better suited for use by consumers and others having relatively little training in the operation of computers. However, those skilled in the art should recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A system for accessing a topic stored as part of an on-line body of documentation, comprising:

a questionless case-based knowledge base, said questionless case-based knowledge base comprised of means for storing a series of questionless case structures in memory, each said questionless case structure comprised of first, second and third fields, said first field containing a topic name, said second field containing a description of said topic named in said first field, and said third field containing a pointer which provides a path to said second field;

a user interface, said user interface comprising means for inputting, as a series of alpha-numeric characters, a natural language description of said topic;

a search engine coupled to said user interface and said questionless case-based knowledge base, said search engine comprising:

means for performing a search of said questionless case-based knowledge base each time one of said series of alpha-numeric characters is entered into said search engine, via said user interface, as an input;

means for identifying, each time one of said series of alpha-numeric characters is entered into said search engine as an input, said questionless case structures which potentially contain said topic, said questionless case structures identified based upon all of said alpha-numeric characters previously entered into said search engine as inputs; and means for selecting said questionless case structure in which said topic is stored;

wherein said means for identifying, each time one of said series of alpha-numeric characters is entered into said search engine as an input, said questionless case structures which potentially contain said topic further comprises:

means for identifying said questionless case structures having at least one word, or a portion thereof, in said first or second fields, which matches said series of alpha-numeric characters previously entered into said search engine as inputs;

means for identifying said questionless case structures having at least one word, or a portion thereof, in said first or second fields, which matches three consecutive alpha-numeric characters of said series of alpha-numeric characters previously entered into said search engine as inputs; and means for identifying said questionless case structures having, in said first or second fields, a numeric representation which falls within a pre-determined value of a numeric representation forming part of said series of alpha-numeric characters previously entered into said search engine as inputs.

2. A system for determining a solution to a problem, comprising:

a questionless case-based knowledge base, said questionless case-based knowledge base comprised of means for storing a series of questionless case structures in memory, each said questionless case structure comprised of a title, a description of a particular problem and a solution to said particular problem;

a search engine;

a user interface, coupled to said search engine, said user interface comprising means for inputting, as a series of alpha-numeric characters, a natural language description of said problem to said search engine; and said search engine coupled to said questionless case-based knowledge base, said search engine comprising:

means for performing a search of said questionless case-based knowledge base each time one of said series of alpha-numeric characters is entered into said search engine as an input;

means for identifying, each time one of said series of alpha-numeric characters is entered into said search engine as an input, said questionless case structures which contain a potential solution to said problem, said questionless case structures identified based upon all of said alpha-numeric characters previously entered into said search engine as inputs; and means for selecting one of said questionless case structures as containing a solution to said problem;

wherein said means for identifying, each time one of said series of alpha-numeric characters is entered into said search engine as an input, said questionless case structures which contain a potential solution to said problem further comprises:

means for identifying said questionless case structures having at least one word or a portion thereof which matches said series of alpha-numeric characters previously entered into said search engine as inputs;

means for identifying said questionless case structures having at least one word or a portion thereof which matches three consecutive alpha-numeric characters of said series of alpha-numeric characters previously entered into said search engine as inputs; and means for identifying said questionless case structures having a numeric representation which falls within a pre-determined value of a numeric representation forming part of said series of alpha-numeric characters previously entered into to said search engine.

3. A system for using on-line documentation to diagnose a problem, comprising:

a questionless case-based knowledge base, said questionless case-based knowledge base comprised of means for storing a series of questionless case structures in memory, each said questionless case structure comprised of a title, a description of a particular problem and a solution to said particular problem;

a search engine coupled to said questionless case-based knowledge base; and a user interface coupled to said search engine, said user interface comprising means for inputting, as a series of alpha-numeric characters, a natural language description of said problem to said search engine;

said search engine comprising:

means for separating said series of alpha-numeric characters into one or more character strings;

means for performing a first search of said questionless case-based knowledge base each time an alpha-numeric character is entered into said search engine as an input, said first search identifying said questionless case structures containing a word, or a portion thereof, which matches one of said character strings previously entered into said search engine as inputs;

means for performing a second search of said questionless case-based knowledge base each time an alpha-numeric character is entered into said search engine as an input, said second search identifying said questionless case structures having at least one word, or a portion thereof, which matches three consecutive alpha-numeric characters of one of said character strings previously entered into said search engine as inputs;

means for performing a third search of said questionless case-based knowledge base each time an alpha-numeric character entered into said search engine as an input, said third search identifying said questionless case structures having a numeric representation which falls within a pre-determined value of a numeric representation forming part of one of said character strings previously entered into said search engine as inputs;

means for identifying said questionless case structures which matches said alpha-numeric characters previously entered into said search engine as inputs;

means for ordering said identified questionless case structures based upon the number of matches detected by said means for identifying; and means for selecting one of said questionless case structures as containing a solution to said problem based upon said ordering of said identified questionless case structures.

4. A system according to claim 3 wherein said ordering means further comprises means for ordering said identified questionless case structures based upon the type of matches detected by said means for identifying.

5. A method for determining a solution to a problem using on-line documentation, comprising the steps of:

forming a questionless case-based knowledge base, said questionless case-based knowledge base comprised of a series of questionless case structures stored in memory, each said questionless case structure comprised of a title, a description of a particular problem and a solution to said particular problem;

determining a natural language description of said problem, said natural language description of said problem comprised of one or more strings of alpha-numeric characters;

inputting, to a search engine, said one or more strings of alpha-numeric characters which describe said natural language description of said problem, one alpha-numeric character at a time;

conducting first, second and third searches of said questionless case-based knowledge base each time one of said alpha-numeric characters is input into said search engine;

said first search of said questionless case-based knowledge base searching for questionless case structures which contain at least one word, or a portion thereof, which exactly matches one of said strings of alpha-numeric characters previously input into said search engine;

said second search of said questionless case-based knowledge base searching for questionless case structures which contain at least one word, or a portion thereof, which exactly matches three consecutive characters of one of said alpha-numeric character strings previously input into said search engine;

said third search of said questionless case-based knowledge base searching for questionless case structures which contain a numeric representation which differs from a numeric representation forming part of one of said alpha-numeric character strings previously input into said search engine by less than a pre-determined value;

determining which of said matching questionless case structures contains a most probable solution to said problem; and selecting, for review, said matching questionless case structures determined to contain the most probable solution to said problem.

6. A method for determining a solution to a problem according to claim 5 wherein the step of selecting one of said matching case structures which contains the most probable solution to said problem further comprises the steps of:

ranking said matching questionless case structures in order of type and number of matches with said searched character strings; and selecting said questionless case structure having the highest ranking for review.

7. A method for determining a solution to a problem according to claim 5 wherein the step of selecting one of said matching case structures which contains the most probable solution to said problem further comprises the steps of:

assigning first, second and third weights to matches respectively determined by said first, second and third searches;

determining a composite score for said matching questionless case structures based upon both number and type of matches detected;

ranking said matching questionless case structures by said composite scores; and selecting said questionless case structure having the highest ranking for review.

8. A system for determining a solution to a problem, comprising:

a questionless case-based knowledge base, said questionless case-based knowledge base comprised of means for storing a series of questionless case structures in memory, each said questionless case structure comprised of a title, a description of a particular problem and a solution to said particular problem;

a search engine;

a user interface, coupled to said search engine, said user interface comprising means for inputting, as a series of alpha-numeric characters, a natural language description of said problem to said search engine; and said search engine coupled to said questionless case-based knowledge base, said search engine comprising:

means for performing first, second and third searches of said questionless case-based knowledge base each time an alpha-numeric character is entered into said search engine as an input, said first search identifying said questionless case structures containing a word, or a portion thereof, which matches one of said character strings previously entered into said search engine as inputs, said second search identifying said questionless case structures having at least one word, or a portion thereof, which matches three consecutive alpha-numeric characters of one of said character strings previously entered into said search engine as inputs and said third search identifying said questionless case structures having a numeric representation which falls within a pre-determined value of a numeric representation forming part of one of said character strings previously entered into said search engine as inputs;

means for identifying, each time one of said series of alpha-numeric characters is entered into said search engine as an input, said questionless case structures which contain a potential solution to said problem, said questionless case structures identified based upon matches between all of said alpha-numeric characters previously entered into said search engine as inputs and said questionless case structures identified by said means for performing first, second and third searches; and means for selecting one of said questionless case structures as containing a solution to said problem.

* * * * *